United States Patent
Kamatani et al.

(10) Patent No.: US 6,765,738 B1
(45) Date of Patent: Jul. 20, 2004

(54) MAGNETIC REPRODUCING APPARATUS AND METHOD FOR DETECTING A DEGREE OF WEAR OF MAGNETIC HEAD ELEMENT

(75) Inventors: Yoshiteru Kamatani, Kanagawa (JP); Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/552,749

(22) Filed: Apr. 19, 2000

(30) Foreign Application Priority Data

Apr. 23, 1999 (JP) .......................................... P11-117120

(51) Int. Cl.[7] .................................................. G11B 5/09
(52) U.S. Cl. .......................................... 360/55; 360/31
(58) Field of Search .............................. 360/55, 31, 29, 360/137

(56) References Cited

U.S. PATENT DOCUMENTS

| | | | |
|---|---|---|---|
| 5,495,371 A | * | 2/1996 | Munemoto et al. ......... 360/137 |
| 5,729,133 A | * | 3/1998 | Sakai et al. .................. 324/210 |
| 5,734,535 A | * | 3/1998 | Nakata et al. ............... 324/262 |
| 5,737,154 A | * | 4/1998 | Kumagai et al. ............ 360/272 |
| 5,864,241 A | * | 1/1999 | Schreck et al. ............. 324/210 |
| 5,982,568 A | * | 11/1999 | Yamamoto et al. ......... 324/212 |

FOREIGN PATENT DOCUMENTS

JP   360202516 A  * 10/1985  ................... 360/65

* cited by examiner

*Primary Examiner*—David Hudspeth
*Assistant Examiner*—Varsha A. Kapadia
(74) *Attorney, Agent, or Firm*—Sonnenschein, Nath & Rosenthal LLP

(57) ABSTRACT

A method for detecting the degree of wear of a magneto-resistance (MR) effect type magnetic head element for reading a magnetic signal by use of a simple structure is disclosed. The degree of wear of an MR head for reading a magnetic signal from a magnetic tape is detected based on a value of resistance of an MR element by a head wear detecting circuit. A signal indicative of the degree of wear of the MR head is supplied to an alarm generating circuit for example, to generate an alarm informing of the life of the MR head.

4 Claims, 5 Drawing Sheets

MAGNETIC REPRODUCING APPARATUS AND METHOD FOR DETECTING A DEGREE OF WEAR OF MAGNETIC HEAD ELEMENT

BACKGROUND OF THE INVENTION

1. Field of the Invention

The present invention relates to a magnetic reproducing apparatus for reproducing a magnetic signal recorded on a magnetic recording medium by using a magneto-resistance effect type magnetic head element and to a method for detecting wear of the magneto-resistance effect type magnetic head element.

2. Description of the Related Art

Hitherto, a magnetic induction type magnetic head element such as a so-called metal-in-gap type magnetic head element and a laminate type magnetic head element has been used as a magnetic head element in a reproducing apparatus for reproducing magnetic signals to/from a magnetic tape such as a video tape recorder (VTR) and a data recorder unit used for backing up data.

In the above-mentioned reproducing apparatus, however, application of a magnetic head element which allows a reproduced output to be obtained fully from narrower tracks has been required to be able to deal with the advancement of digitalization and multi-media of the future.

In order to meet with such requirement, there has been proposed a technology of using a magneto-resistance effect type magnetic head element (hereinafter referred to as an MR head) using a magneto-resistance effect used as a reproducing magnetic head element in a hard disk unit and the like as a reproducing magnetic head element of the above-mentioned reproducing apparatus.

The MR head used in the hard disk unit and the like is created by bonding a pair of substrates made of soft magnetic substance for example in a body via a gap and by forming a thin film of a magneto-resistance effect element (hereinafter referred to as an MR element) which exhibits the magneto-resistance effect within the gap.

This MR head is drawing attention as a device essential for realizing the further high density magnetic recording because it readily permits narrower tracks because the width of the track is determined by the width of the MR element formed as a thin film, and because its reproducing sensitivity is high since the MR element is exposed out of a plane facing the magnetic recording medium.

By the way, the magnetic induction type magnetic head element used in the reproducing apparatus for reproducing magnetic signals to/from the magnetic tape in the past has permitted a certain degree of wear. However, because the MR element that exhibits the magneto-resistance effect is exposed out of the plane facing to the magnetic recording medium in the MR head, the restriction on its wear is strict as compared to that of the magnetic induction type magnetic head element.

Although the wear of the MR head has not been much of a problem because it reads the magnetic signal while floating on the magnetic disk in the hard disk unit, the wear of the MR head advances when it is used for a long period of time as it slides against the magnetic tape when the MR head is applied as the reproducing magnetic head element of the reproducing apparatus for reproducing the magnetic signal to/from the magnetic tape, because the reproducing apparatus reproduces the magnetic signal while sliding the magnetic head element against the magnetic tape.

The magnetic signal cannot be read adequately when the magnetic signal is to be read continuously by using the worn out MR head. Accordingly, it is necessary to detect the degree of wear caused by the use of the MR head and to replace the worn out MR head with a new MR head when the degree of wear of the MR head exceeds a predetermined value when the MR head is used as the reproducing magnetic head element of the reproducing apparatus for reproducing the magnetic signal to/from the magnetic tape.

The present invention has been devised in view of the above-mentioned circumstances and provides a magnetic reproducing apparatus which can detect the degree of wear of the magneto-resistance effect type magnetic head element for reading a magnetic signal adequately with a simple structure and a method for detecting the degree of wear of the magnetic head element.

SUMMARY OF THE INVENTION

An inventive magnetic reproducing apparatus comprises a magneto-resistance effect type magnetic head element for reading a magnetic signal recorded on a magnetic recording medium and wear detecting means for detecting the degree of wear of the magnetic head element from a value of resistance of the magnetic head element.

The magnetic signal recorded on the magnetic recording medium is read out of the magnetic recording medium by the magneto-resistance effect type magnetic head element in the inventive magnetic reproducing apparatus. The magnetic head element wears along the operation for reading the magnetic signal. The wear detecting means detects the degree of wear of the magnetic head element. The wear detecting means detects the degree of wear of the magnetic head element from the value of resistance of the magnetic head element.

Because the wear detecting means detects the degree of wear of the magnetic head element from the value of resistance of the magneto-resistance effect type magnetic head element in the inventive magnetic reproducing apparatus as described above, the degree of wear of the magnetic head element may be detected simply and adequately.

Preferably, the inventive magnetic reproducing apparatus further comprises alarm generating means for generating an alarm informing of the life of the magnetic head element when a value indicative of the degree of wear of the magnetic head element detected by the wear detecting means exceeds a predetermined value.

The inventive magnetic reproducing apparatus is provided with the alarm generating means which generates an alarm informing of the life of the magnetic head element when the value indicative of the degree of wear of the magnetic head element detected by the wear detecting means exceeds the predetermined value as described above, so that it can inform of the life of the magnetic head element to the user reliably.

Preferably, in the inventive magnetic reproducing apparatus, the wear detecting means measures the value of resistance of the magnetic head element when the magnetic head element is not operative to read the magnetic signal recorded on the magnetic recording medium and the degree of wear of the magnetic head element is detected based on this value of resistance.

It is also possible to detect the degree of wear of the magnetic head element adequately in the inventive magnetic reproducing apparatus without affecting the magnetic signal read out of the magnetic recording medium by the magnetic head element by measuring the value of resistance of the magnetic head element by the wear detecting means during when the magnetic head element is not operative to read the magnetic signal recorded on the magnetic recording medium and by detecting the degree of wear of the magnetic head element based on the value of resistance.

An inventive method for detecting a degree of wear of a magnetic head element comprises steps of measuring a value of resistance of a magneto-resistance effect type magnetic head element for reading a magnetic signal recorded on a magnetic recording medium and of detecting the degree of wear of the magnetic head element based on the value of resistance of the magnetic head element.

Because the inventive method for detecting the degree of wear of the magnetic head element comprises the steps of measuring the value of resistance of the magneto-resistance effect type magnetic head element and of detecting the degree of wear of the magnetic head element based on the value of resistance, the degree of wear of the magnetic head element may be detected simply and adequately.

Preferably, the method for detecting a degree of wear of a magnetic head element further comprises a step of generating an alarm informing of the life of the magnetic head element when the degree of wear of the magnetic head element exceeds a predetermined value.

Because the method for detecting the degree of wear of the magnetic head element comprises the step of generating an alarm informing of the life of the magnetic head element when the degree of wear of the magnetic head element exceeds the predetermined value as described above, it can inform of the life of the magnetic head element to the user reliably.

In the method for detecting the degree of wear of the magnetic head element, preferably the value of resistance of the magnetic head element is measured when no operation of reading the magnetic signal recorded on the magnetic recording medium is carried out.

It is then possible to detect the degree of wear of the magnetic head element adequately by the inventive method for detecting the degree of wear of the magnetic head element without affecting the magnetic signal read out of the magnetic recording medium by the magnetic head element by detecting the degree of wear of the magnetic head element during when the magnetic head element is not operative to read the magnetic signal recorded on the magnetic recording medium.

The specific nature of the invention, as well as other objects, uses and advantages thereof, will clearly appear from the following description and from the accompanying drawings.

DESCRIPTION OF THE PREFERRED EMBODIMENT

A preferred embodiment of the invention will be explained below with reference to the drawings. It is noted that although a case of applying the invention to a reproducing apparatus for reproducing a magnetic signal to/from a magnetic tape by means of helical scan scheme will be explained here, the invention is not limited to that and is applicable to all kinds of reproducing apparatuses which are constructed so as to read a signal from a magnetic recording medium in the state in which the reproducing magnetic head element contacts with the magnetic recording medium like those which use a disk-like recording medium as a recording medium and which reproduce a signal to/from a recording medium by a stationary head.

Figure 1:
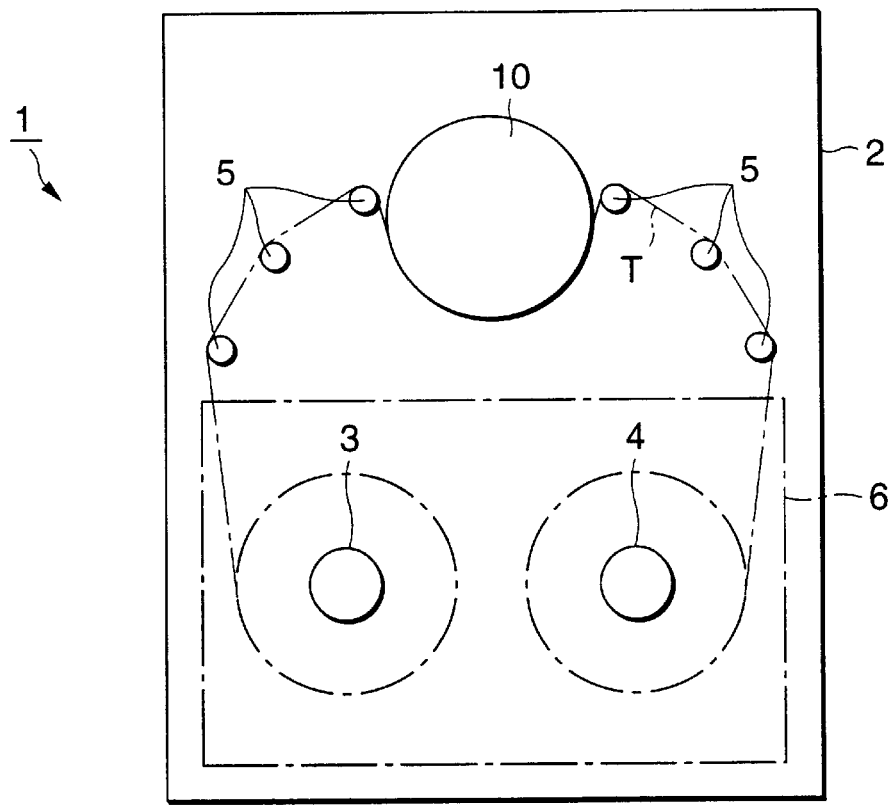
FIG. 1 is a diagrammatic view showing the schematic structure of a reproducing apparatus to which the present invention has been applied.

FIG. 1 shows one example of the reproducing apparatus to which the invention is applied. As shown in FIG. 1, the reproducing apparatus 1 comprises a rotary magnetic head unit 10 having a stationary drum fixed to a base within a case 2 and a rotary drum provided rotably with respect to the stationary drum, a pair of turning shafts 3, 4 for turning a feeding reel and a take-up reel of a magnetic tape T and a plurality of guide pins 5 for guiding the magnetic tape T. When a tape cassette 6 having the magnetic tape T is inserted to a cassette attaching section provided within the case 2, the reproducing apparatus 1 pulls out the magnetic tape T from the tape cassette 6 to run the magnetic tape T while winding around the peripheral plane of the rotary magnetic head unit 10 along the guide pins 5 to reproduce a magnetic signal to/from the running magnetic tape T by the rotary magnetic head unit 10.

Figure 2:
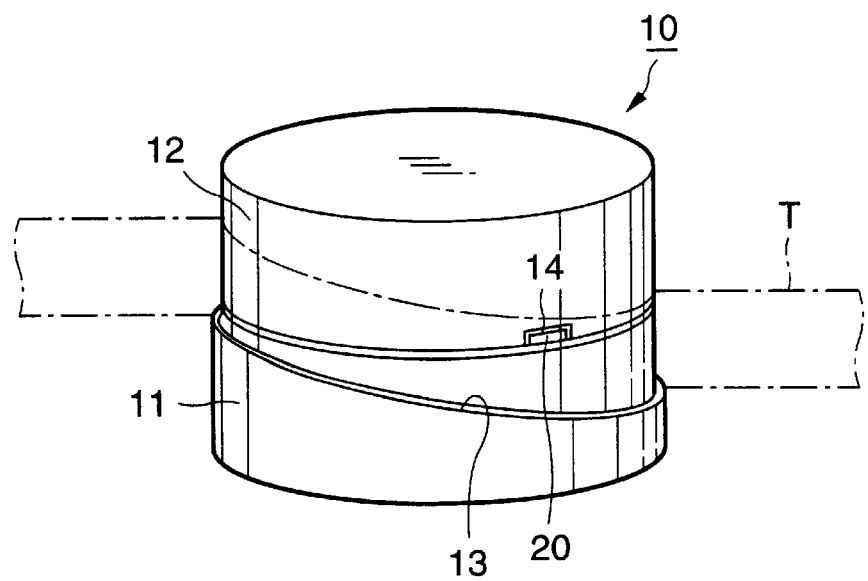
FIG. 2 is a perspective view of a rotary magnetic head unit of the reproducing apparatus.
Figure 3:
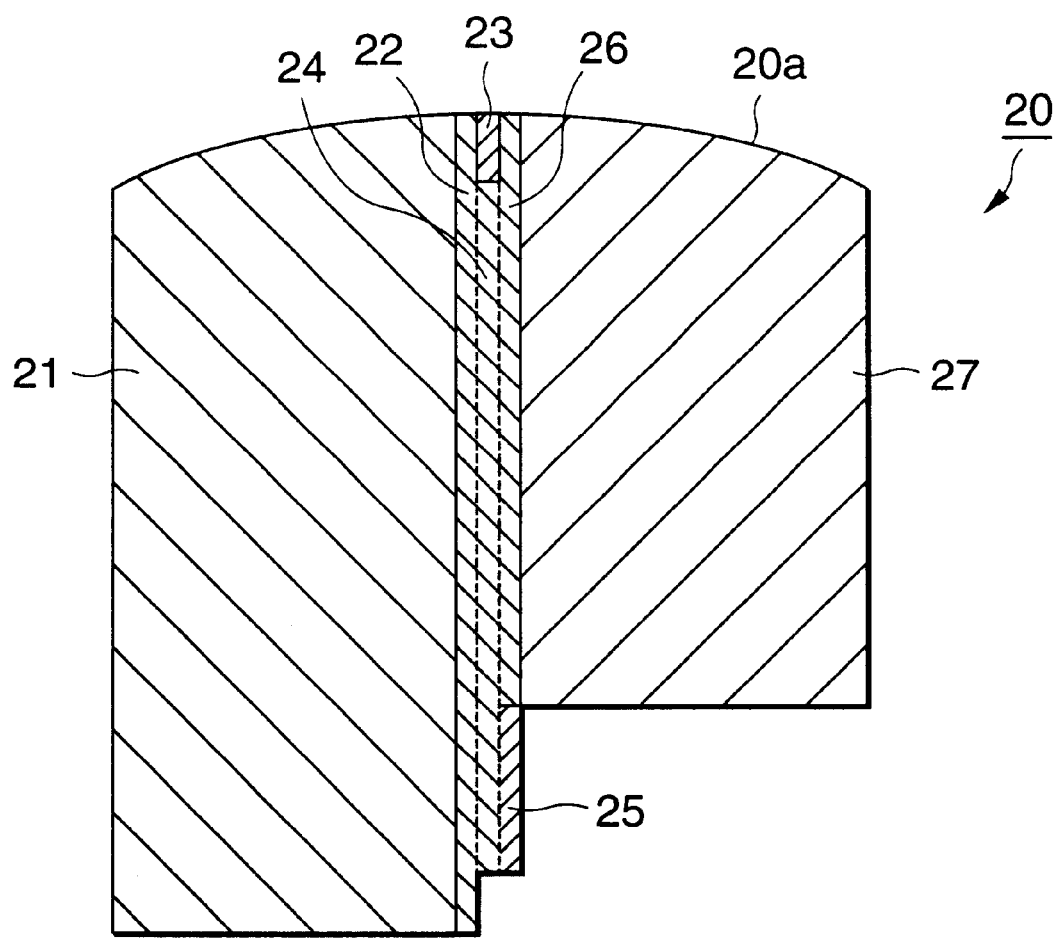
FIG. 3 is a longitudinal section view of a MR head of the rotary magnetic head unit.
Figure 4:
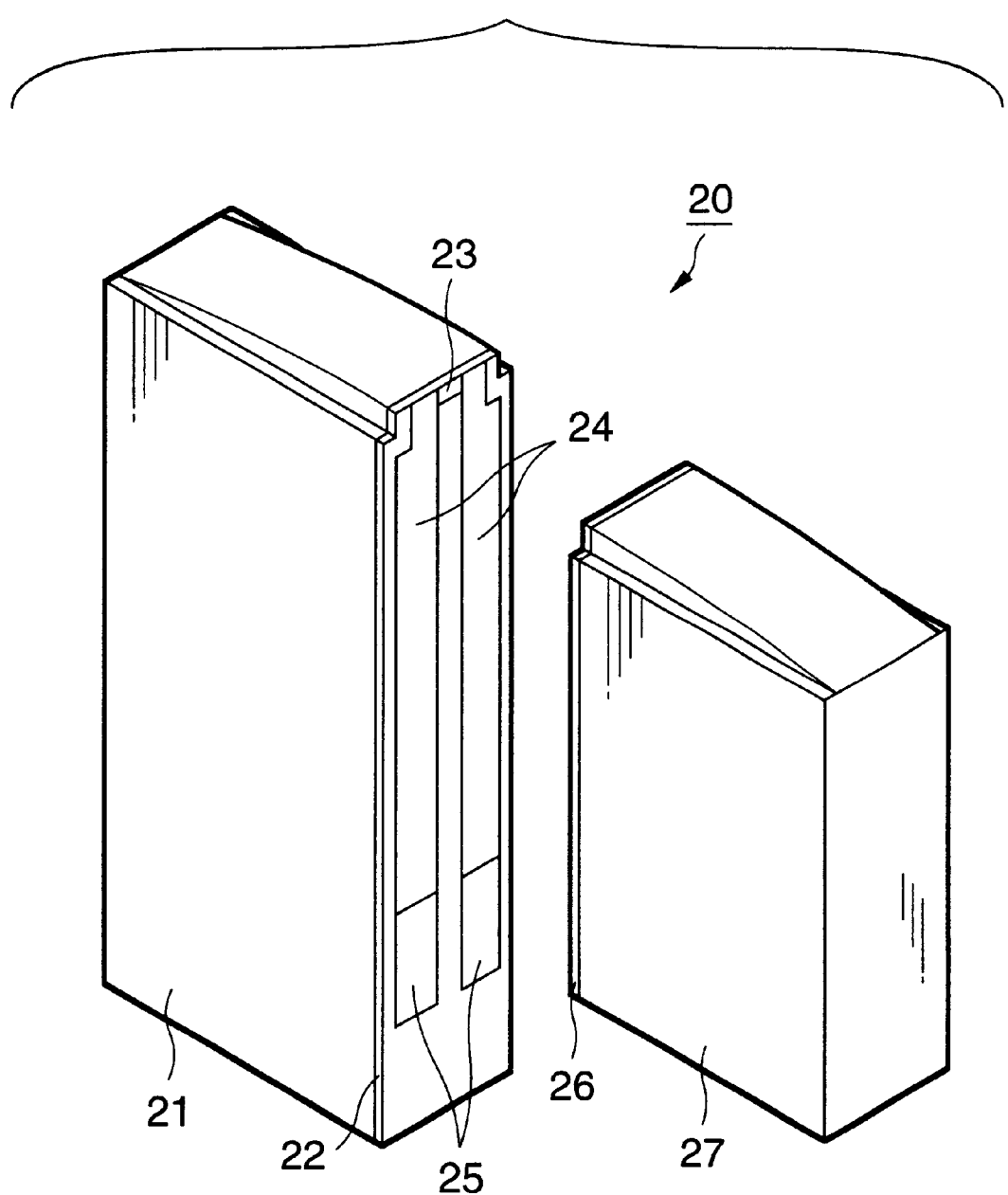
FIG. 4 is an exploded perspective view of the MR head.

The rotary magnetic head unit 10 has a columnar stationary drum 11 and a rotary drum 12 as shown in FIG. 2. The rotary drum 12 is attached to a rotary shaft of a motor (not shown) so as to turn centering on the rotary shaft.

A tape guide groove 13 for maintaining the position of the magnetic tape T which slidably contacts with the rotary magnetic head unit 10 is created at the peripheral plane of the stationary drum 11. The tape guide groove 13 is created so as to incline with respect to the direction crossing at right angles to the rotary shaft of the motor by a predetermined angle. The magnetic tape T runs along the peripheral plane of the rotary magnetic head unit 10 while slanting with respect to the direction crossing at right angles to the rotary shaft of the motor by the predetermined angle as it is wound around the peripheral plane of the rotary magnetic head unit 10 along the tape guide groove 13.

The rotary drum 12 is provided with a window 14 which opens at the peripheral plane thereof. A magnetic head element 20 is attached to the rotary drum 12 so that it protrudes to the outside more or less via the window 14. The magnetic head element 20 moves while drawing a circular orbit centering on the center of rotation of the rotary drum 12 as the rotary drum 12 rotates. Thereby, the magnetic head element 20 attached to the rotary drum 12 slides aslant on the magnetic tape T running aslant along the peripheral plane of the rotary magnetic head unit 10.

The reproducing apparatus 1 to which the invention is applied uses a magneto-resistance effect type magnetic head element (hereinafter referred to as an MR head 20) for reading a magnetic signal recorded on the magnetic tape T by using the magneto-resistance effect.

The MR head 20 is constructed as a so-called substrate shield type MR head in which a magneto-resistance effect element (hereinafter referred to as an MR element) that exhibits the magneto-resistance effect is sandwiched by a pair of soft magnetic ferrite substrates via a gap of an insulating film. It is noted that in the inventive magnetic reproducing apparatus, the type of the MR head used as the magnetic head element 20 is not limited to be the substrate shield type MR head illustrated here and all types of MR heads such as a thin film shield type MR head and a non-shield type MR head are applicable. It is also possible to use a spin valve type MR element utilizing the spin valve effect, an MR head utilizing the ferro-magnetic tunnel effect and a GMR head having a GMR film which exhibits a gigantic magneto-resistance effect.

As compared to the inductive magnetic head element used in the past as a reproducing magnetic head element in a helical scan type reproducing apparatus, the MR head 20 is characterized in that it permits the narrower gap and allows a high reproducing output to be obtained. Accordingly, the reproducing characteristics of the reproducing apparatus 1 may be improved while accommodating to the high density recording by applying the MR head 20 as the reproducing magnetic head element.

The substrate shield type MR head 20 used as the reproducing magnetic head element in the reproducing apparatus 1 comprises a first shield substrate 21 made of soft magnetic ferrite, a first insulating film 22 formed on the first shield substrate 21, an MR element 23 formed on the first insulating film so that one end thereof faces to the outside from a medium sliding plane 20a, a pair of conductor sections 24 formed on the first insulating film 22 so that one end thereof is connected to the MR element 23, connecting terminal sections 25 provided respectively at the other end of the pair of conductor sections 24, a second insulating film 26 formed so as to cover the MR element 23 and the pair of conductor sections 24 and a second shield substrate 27 made of soft magnetic ferrite bonded on the second insulating film 26.

The MR head 20 is constructed so that the gap of the first and second insulating films 22 and 26 is formed between the first and second shield substrates 21 and 27 and the MR element 23 is disposed within the gap. Then, sense current is supplied to the MR element 23 via the connecting terminal section 25 and the pair of conductor sections 24.

The MR head 20 constructed as described above is, for example, mounted to the rotary drum 12 while being attached to a head base (not shown). Then, the MR head 20 rotates as the rotary drum 12 rotates and the medium sliding plane 20a slides on the magnetic tape T on which the magnetic signal has been recorded. At this time, the MR element 23 changes its value of resistance corresponding to changes of magnetic field of the magnetic tape T corresponding to the recorded signals. The MR head 20 reads the magnetic signal recorded on the magnetic tape T by supplying the sense current to the MR element 23 to detect the changes of resistance thereof.

Here, the operation for reproducing the magnetic signal recorded on the magnetic tape T by the reproducing apparatus 1 constructed as described above will be explained.

In reproducing the magnetic signal recorded on the magnetic tape T by the reproducing apparatus 1, the tape cassette 6 storing the magnetic tape T is inserted to the cassette attaching section within the case 2. At this time, the pair of rotary shafts 3 and 4 are inserted through the center part of the feed reel and the take-up reel of the tape cassette 6, respectively. Then, the magnetic tape T is pulled out of the cassette to be set on the tape running path within the case 2 formed by the plurality of guide pins 5. Thereby, the magnetic tape T is wound around the peripheral plane of the rotary magnetic head unit 10 aslant by an angle of winding of 180 degrees for example at the mid-way part of the running path.

Next, the take-up reel rotates as the rotary shaft 3 inserted through the center part of the take-up reel is driven and the magnetic tape T runs on the running path at predetermined speed. Further, the rotary drum 12 of the rotary magnetic head unit 10 rotates together with the rotation of the motor. Thereby, the MR head 20 attached to the rotary drum 12 of the rotary magnetic head unit 10 slides aslant on the running magnetic tape T and reads the magnetic signal recorded on the magnetic tape T.

The signal read by the MR head 20 is transmitted in AC to the stationary drum 11 side via a rotary transformer provided between the rotary drum 12 and the stationary drum 11 and is then supplied to a signal processing circuit constructed on the circuit board provided on the back of the base within the case 2 to be outputted to the outside as a reproduced signal.

By the way, the MR head 20 used as the reproducing magnetic head element in the reproducing apparatus 1 to which the present invention is applied slides at high speed on the magnetic tape T which runs while being wound around the peripheral plane of the rotary magnetic head unit 10, so that the medium sliding plane 20a wears when it is used for a long period of time. Then, when the distance (hereinafter referred to as an MR height) from the tip portion to the basal end portion of the medium sliding plane 20a of the MR element 23 becomes shorter than a predetermined value by the wear, the magnetic signal may not be read adequately from the magnetic tape T.

Then, in the reproducing apparatus 1 to which the invention is applied, a head wear detecting circuit for detecting the degree of wear of the MR head 20 is provided beside the reproducing circuit to detect the degree of wear of the MR head 20 used as the reproducing magnetic head element. When the degree of wear of the MR head 20 exceeds the predetermined value, i.e., when the MR height becomes shorter than the predetermined value, the reproducing apparatus 1 informs the user of the need to replace the worn out MR head 20 with a new MR head.

Figure 5:
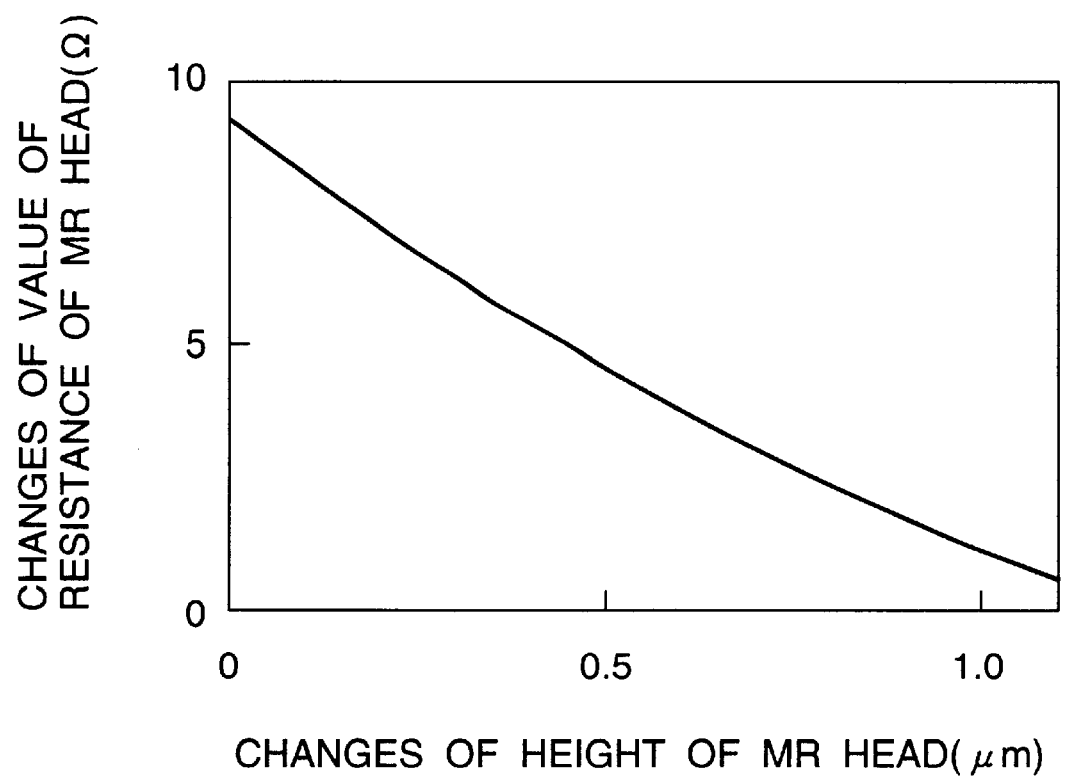
FIG. 5 is a graph showing one example of the relationship between changes of values of resistance of a MR element and height of the MR head.

FIG. 5 shows one example of the relationship between changes of value of resistance of the MR element 23 and the variation of the MR height. As it is apparent from FIG. 5, the value of resistance of the MR element 23 is determined uniquely by the MR height and the smaller the MR height, i.e., the more the MR head 20 wears, the higher the value of resistance of the MR element 23 becomes. Then, the inventive reproducing apparatus 1 is arranged so as to detect the value of resistance of the MR element 23 to recognize the degree of the MR height, i.e., the degree of wear of the MR head. When the degree of wear of the MR head 20 exceeds the predetermined value, the reproducing apparatus 1 generates an alarm to urge the user to replace the MR head 20.

Figure 6:
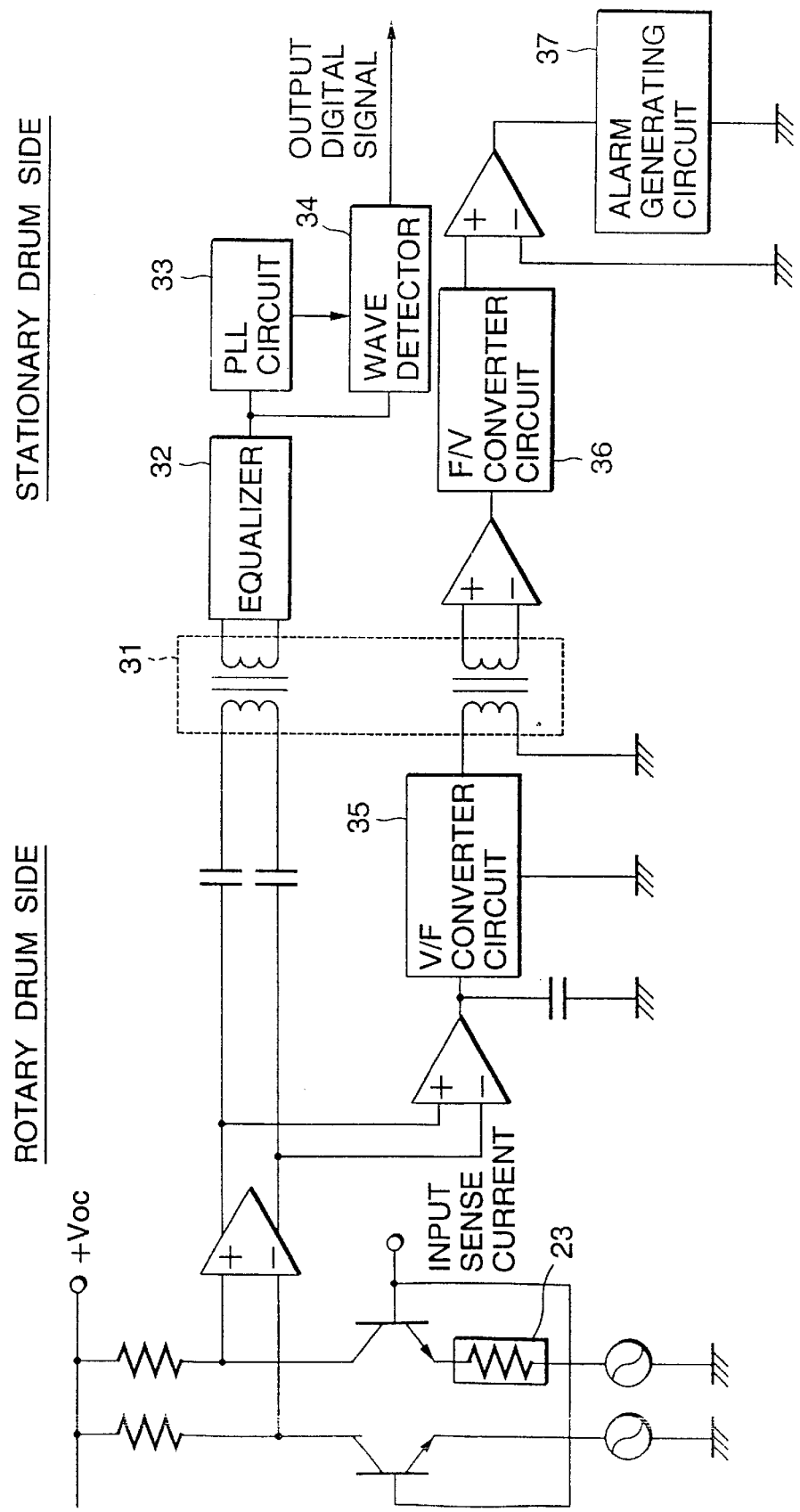
FIG. 6 is a diagram showing the circuit structure containing a reproducing circuit and a head wear detecting circuit of the reproducing apparatus.

FIG. 6 shows one example of the circuit structure containing the reproducing circuit and the head wear detecting circuit of the reproducing apparatus 1. When sense current is supplied to the MR element 23 of the MR head 20 sliding on the magnetic tape T in the reproducing apparatus 1, the value of resistance of the MR element 23 changes in correspondence to the magnetic signals recorded on the magnetic tape T and the changes of the value of resistance of the MR element 23 is detected as changes of voltage. The signal detected by the MR element 23 is transmitted in AC from the rotary drum 12 side to the stationary drum 11 side via the rotary transformer 31. The signal transmitted to the stationary drum 11 side is outputted as a digital signal via an equalizer 32, a PLL circuit 33 and a wave detector 34.

Meanwhile, the degree of wear of the MR head 20 is detected by utilizing open time before or after implementing the reproducing operation. That is, the degree of wear of the MR head 20 is detected while the magnetic tape T is not wound around the peripheral plane of the rotary magnetic head unit 10 and the MR head 20 is separated from the magnetic tape T. Thus the degree of wear of the MR head 20 may be detected adequately without affecting the detection of the reproduced signal by detecting it while the MR head 20 is separated from the magnetic tape T.

When the sense current is supplied to the MR element 23 of the MR head 20 when the MR head 20 is separated from the magnetic tape T, the value of resistance of the MR element 23 is uniquely determined in correspondence to the degree of wear thereof, so that an output of constant level corresponding to the degree of wear may be obtained. The output of the constant level corresponding to the degree of wear of the MR element 23 is amplified by an amplifier and is then supplied to a V/F converter 35. Because the rotary transformer 31 for transmitting signals between the rotary drum 12 and the stationary drum 11 transmits only AC signals, the output of the constant level corresponding to the degree of wear of the MR element 23 is transmitted to the stationary drum 11 side as an AC signal via the rotary transformer 31 after being frequency converted by the V/F converter 35.

The AC signal transmitted to the stationary drum 11 side via the rotary transformer is amplified by the amplifier and is then supplied to a F/V converter 36 to be F/V converted. The signal indicative of the degree of wear of the MR element 23 which is F/V converted by the F/V converter 36 is supplied to an alarm generating circuit 37 after being amplified by an amplifier. The alarm generating circuit 37 judges whether or not the degree of wear of the MR element 23 has exceeded the predetermined value by judging whether or not the signal level indicative of the degree of wear of the MR element 23 supplied from the F/V circuit 36 is higher than the preset level. When the signal level indicative of the degree of wear of the MR element 23 is higher than the level set in advance, i.e., when the alarm generating circuit 37 judges that the degree of wear of the MR element 23 has exceeded the predetermined value, it generates an alarm to urge the user to replace the MR head 20. It allows the user to recognize the life of the MR head 20 precisely and to avoid in advance such accidents that a picture is interrupted on the way or data is vanished due to such reason that the signal recorded on the magnetic tape is not reproduced adequately.

According to the inventive magnetic reproducing apparatus, the wear detecting means detects the degree of wear of the magnetic head element from the value of resistance of the magneto-resistance effect type magnetic head element, so that the degree of wear of the magnetic head element may be detected simply and adequately.

The inventive magnetic reproducing apparatus is also provided with the alarm generating means which generates an alarm informing of the life of the magnetic head element when the value indicative of the degree of wear of the magnetic head element detected by the wear detecting means exceeds the predetermined value, so that it can inform of the life of the magnetic head element to the user reliably.

It is also possible to detect the degree of wear of the magnetic head element adequately in the inventive magnetic reproducing apparatus without affecting the magnetic signal read out of the magnetic recording medium by the magnetic head element by measuring the value of resistance of the magnetic head element by the wear detecting means while the magnetic head element is not operative to read the magnetic signal recorded on the magnetic recording medium and by detecting the degree of wear of the magnetic head element based on the value of resistance.

The inventive method for detecting the degree of wear of the magnetic head element comprises steps of measuring the value of resistance of the magneto-resistance effect type magnetic head element and of detecting the degree of wear of the magnetic head element based on the value of resistance, so that the degree of wear of the magnetic head element may be detected simply and adequately.

The inventive method for detecting the degree of wear of the magnetic head element comprises a step of generating an alarm for reliably informing the user of the life of the magnetic head element when the degree of wear of the magnetic head element exceeds the predetermined value.

It is also possible to detect the degree of wear of the magnetic head element adequately by the inventive method for detecting the degree of wear of the magnetic head element without affecting the magnetic signal read out of the magnetic recording medium by the magnetic head element by measuring the value of resistance of the magnetic head element by the wear detecting means while the magnetic head element is not operative to read the magnetic signal recorded on the magnetic recording medium and by detecting the degree of wear of the magnetic head element based on the value of resistance.

While the preferred embodiment has been described, variations thereto will occur to those skilled in the art within the scope of the present inventive concepts which are delineated by the following claims.

What is claimed is:

1. A magnetic reproducing apparatus, comprising:
   a magneto-resistance effect type magnetic head element mounted on a rotary drum for reading a magnetic signal recorded on a magnetic recording medium in a helical scan recording system; and
   wear detecting means for detecting a degree of wear of said magnetic head element from a value of resistance of said magnetic head element in an absence of an external magnetic field, said value of resistance of the magnetic head element being measured when the magnetic head element is not reading the magnetic signal recorded on the magnetic recording medium;
   wherein said wear detecting means transmits a signal indicative of the value of resistance of said magnetic head element outside the apparatus via a rotary transformer after converting it into a frequency proportional to the value of resistance as an AC signal, and wherein the wear detecting means converts and outputs the AC signal transmitted via the rotary transformer to a signal indicative of the value of resistance of the magnetic head element.

2. The magnetic reproducing apparatus according to claim 1, further comprising:
   alarm generating means for generating an alarm informing of a life of said magnetic head element when a value indicative of the degree of wear of said magnetic head element detected by said wear detecting means exceeds a predetermined value.

3. A method for detecting a degree of wear of a magnetic head element, comprising:
   measuring a value of resistance of a magneto-resistance effect type magnetic head element for reading a magnetic signal recorded on a magnetic recording medium in a helical scan recording system while the magnetic signal recorded on the magnetic recording medium is not being read, wherein said magnetic head element is mounted on a rotary drum;
   detecting a degree of wear of said magnetic head element based on the value of resistance of said magnetic head element in an absence of an external magnetic field;
   transmitting a signal indicative of the value of resistance of said magnetic head element via a rotary transformer after converting it to a frequency proportional to the value of resistance as an AC signal; and
   converting and outputting the AC signal transmitted via the rotary transformer to a signal indicative of the value of resistance of the magnetic head element.

4. The method for detecting a degree of wear of a magnetic head element according to claim 3, further comprising:
   generating an alarm informing of a life of said magnetic head element when the degree of wear of said magnetic head element exceeds a predetermined value.

* * * * *